(12) United States Patent
Guinan et al.

(10) Patent No.: US 9,726,080 B2
(45) Date of Patent: Aug. 8, 2017

(54) HELICAL CROSS FLOW (HCF) PULSE DETONATION ENGINE

(71) Applicant: Orbital ATK, Inc., Dulles, VA (US)

(72) Inventors: Daniel P. Guinan, Hobe Sound, FL (US); Christopher D. Gettinger, Palm Beach Gardens, FL (US)

(73) Assignee: Orbital ATK, Inc., Plymouth, MN (US)

(*) Notice: Subject to any disclaimer, the term of this patent is extended or adjusted under 35 U.S.C. 154(b) by 1334 days.

(21) Appl. No.: 13/886,030

(22) Filed: May 2, 2013

(65) Prior Publication Data

US 2013/0263569 A1    Oct. 10, 2013

Related U.S. Application Data

(62) Division of application No. 12/414,281, filed on Mar. 30, 2009, now Pat. No. 8,438,834.

(51) Int. Cl.
| | |
|---|---|
| *F02C 5/12* | (2006.01) |
| *F23R 7/00* | (2006.01) |
| *F02K 7/06* | (2006.01) |
| *F02C 3/16* | (2006.01) |
| *F02C 5/04* | (2006.01) |

(52) U.S. Cl.
CPC ............ *F02C 5/12* (2013.01); *F02K 7/06* (2013.01); *F23R 7/00* (2013.01); *F02C 3/165* (2013.01); *F02C 5/04* (2013.01); *F05D 2250/25* (2013.01)

(58) Field of Classification Search
CPC .... F02C 3/16; F02C 5/04; F02C 3/165; F02C 5/12; F02K 7/06; F05D 2250/25; F23R 7/00
See application file for complete search history.

(56) References Cited

U.S. PATENT DOCUMENTS

| | | | |
|---|---|---|---|
| 903,657 A | 11/1908 | Beckmann | |
| 2,074,602 A | 3/1937 | Wilstam | |
| 2,174,266 A * | 9/1939 | Jackson | F23R 3/14 60/39.38 |
| 2,547,560 A * | 4/1951 | Brodzinsky | F02B 19/02 137/625.34 |
| 2,644,512 A * | 7/1953 | Durr | F23C 15/00 60/39.77 |
| 2,667,032 A | 1/1954 | Boulet | |
| 4,266,571 A | 5/1981 | Bauder | |
| 4,702,072 A | 10/1987 | Kielhorn | |
| 5,615,548 A * | 4/1997 | Winfree | F01L 7/04 60/247 |
| 6,349,538 B1 * | 2/2002 | Hunter, Jr. | F02K 7/06 60/247 |
| 6,439,503 B1 * | 8/2002 | Winfree | F02K 7/06 60/247 |
| 6,584,765 B1 | 7/2003 | Tew et al. | |
| 6,725,646 B2 | 4/2004 | Callas et al. | |
| 6,845,620 B2 | 1/2005 | Nalim | |
| 7,100,360 B2 | 9/2006 | Sammann et al. | |
| 7,251,928 B2 | 8/2007 | Kojima et al. | |
| 8,037,620 B2 | 10/2011 | Grobler et al. | |
| 2003/0182927 A1 * | 10/2003 | Leyva | F02K 7/02 60/247 |
| 2009/0102203 A1 | 4/2009 | Lu et al. | |

* cited by examiner

*Primary Examiner* — Ted Kim
(74) *Attorney, Agent, or Firm* — TraskBritt (57) ABSTRACT

A helical cross flow pulse detonation engine.

13 Claims, 8 Drawing Sheets

HELICAL CROSS FLOW (HCF) PULSE DETONATION ENGINE

CROSS-REFERENCE TO RELATED APPLICATION

This application is a divisional of U.S. Patent Application Ser. No. 12/414,281, filed Mar. 30, 2009, now U.S. Pat. No. 8,438,834, issued May 14, 2013, the disclosure of which is hereby incorporated herein in its entirety by this reference.

FIELD OF THE INVENTION

The present invention is directed to pulse detonation engines and, more specifically, to helical cross flow (HCF) pulse detonation engines.

BACKGROUND OF THE INVENTION

A pulse detonation engine (PDE) is a type of engine operating as a propulsion system in a craft that can operate theoretically from subsonic up to hypersonic speeds. Theoretically, a pulse detonation engine can have a burn efficiency higher than that of other types of engine designs, such as turbojet engines, turbofan engines, and pulse jet engines, and will have fewer moving parts than other types of engine designs.

Common jet engines and many rocket engines operate on the deflagration of fuel, the rapid but subsonic combustion of fuel, because when using typical hydrocarbon based fuels, combustion velocity rates are in the range of about 25 feet per second to about 125 feet per second. While the combustion velocity of the -subsonic deflagration of fuel is slow in a typical jet engine, the fuel is burned completely within the engine so long an after burner is not used on the engine. A pulse detonation engine differs from the prior art jet engines and pulse jet engines because the pulse detonation engine operates on the supersonic detonation of fuel, rather than the subsonic burning of the fuel. In a pulse jet engine, fuel is mixed with air to create a mixture that is ignited with the resulting detonation of the fuel-air mixture increasing detonation velocity to supersonic velocities and the pressure of the combustion gases to high pressure levels. The combustion gases are then expanded through a nozzle for thrust pushing the vehicle forward.

A pulse detonation engine differs from a pulse jet engine in that a pulse detonation engine does not use subsonic combustion that is used in a pulse jet engine. In a pulse detonation engine oxygen and fuel combine to generate supersonic combustion through detonation of the fuel-oxygen mixture effectively creating a reoccurring and continuous series of explosions of oxygen and fuel within the engine, rather than burning the fuel -subsonically by deflagration of the fuel, as in a pulse jet engine. By changing the engine operating cycle from burning the fuel-air mixture to an explosive detonation of the fuel-oxygen mixture, the overall operating efficiency of the engine is theoretically increased. The operating efficiency of a pulse detonation engine is increased because a pulse detonation engine uses a supersonic combustion process that burns all the fuel while still in the engine at a high pressure producing a constant volume combustion process for the exhaust gases to be discharged from the engine at high velocity. This inherently increases the burn efficiency of the engine; i.e., the amount of heat produced per unit of fuel, above other types of engines, although conversion of the energy produced within a pulse detonation engine to thrust is difficult. Also, a pulse detonation engine needs to produce a large number of fuel detonations within the engine in a short period of time to sustain the thrust level of the engine, which requires a very short detonation cycle time for the engine. While the overall increase in the engine burning efficiency of a pulse detonation engine is increased over that of an engine using burning of a fuel-air mixture, pulse detonation engines must continuously generate a large number of detonations within the engine and convert the combustion gases into an effective thrust from the engine to power a vehicle.

To ensure that the combustion gases exit aft of the vehicle some types of pulse detonation engines, like a pulse jet engines, use a type of shutter or equivalent valve structure to close the front of the pulse detonation engine preventing the combustion gases from exiting the front of the engine. The timing of the closing of the shutters or valves to force the combustion gases to exit the engine aft in only one direction is an important consideration in pulse detonation engine design.

Pulse detonation engines are designed as either valve-less engines or engines having valves. Some prior art types of pulse detonation engine are set forth in U.S. Pat. Nos. 6,584,765 6,725,646, 6,845,620, and 7,251,928. A pulsed combustion engine is set forth in U.S. Pat. No. 7,100,360.

It is desirable to have a pulse detonation engine that can operate at very high rates of fuel-oxygen detonation to continuously provide thrust for a vehicle.

SUMMARY OF THE INVENTION

A helical cross flow pulse detonation engine.

DETAILED DESCRIPTION OF THE INVENTION

Figure 1:
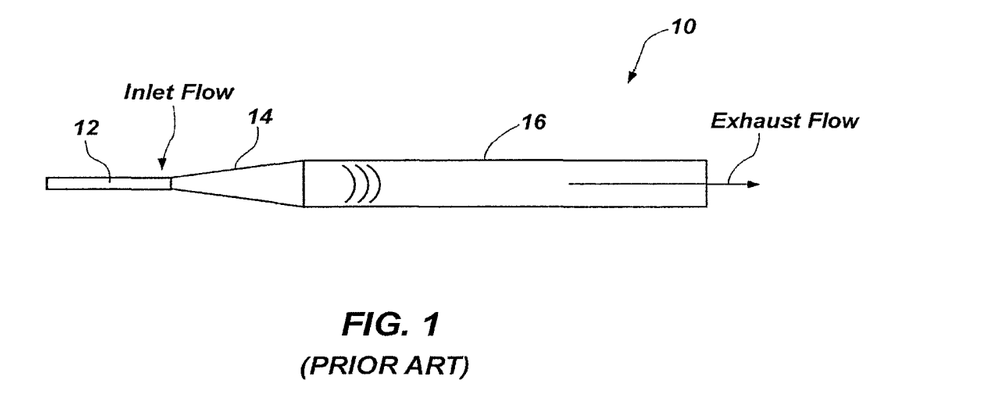
FIG. 1 is a cross-sectional view of a conventional pulse detonation engine.

Illustrated in FIG. 1 is a portion of a conventional pulse detonation engine 10 having a detonation initiation tube 12 where fuel and oxidizer, typically air, are mixed and ignited in a deflagration-to-detonation transition (DDT) to start a high energy deflagration to have it accelerated down the tube 12 where it increases in velocity to becoming a detonation of the fuel. The tube 12 is connected to a frustoconical annular air valve and detonation wave expansion member 14 where the detonation wave from the detonation of the fuel-air mixture in the tube 12 expands as is flows through the member 14 into the combustor tube 16 to flow therefrom to produce thrust from the detonation of the fuel-air mixture in the tube 12. As illustrated, the detonation wave from the detonation of the fuel and oxidizer flows along the length of the combustor tube 16 and therefrom. As the combustion gases from detonation of the fuel and oxidizer flow along the length of the combustor tube 16, the length of time for the combustion gases to exit the pulse detonation engine 10 is determined by the length of the combustor tube 16. To shorten the time for combustion gases to exit the combustor tube 16, the combustor tube 16 must be made shorter.

Figure 2:
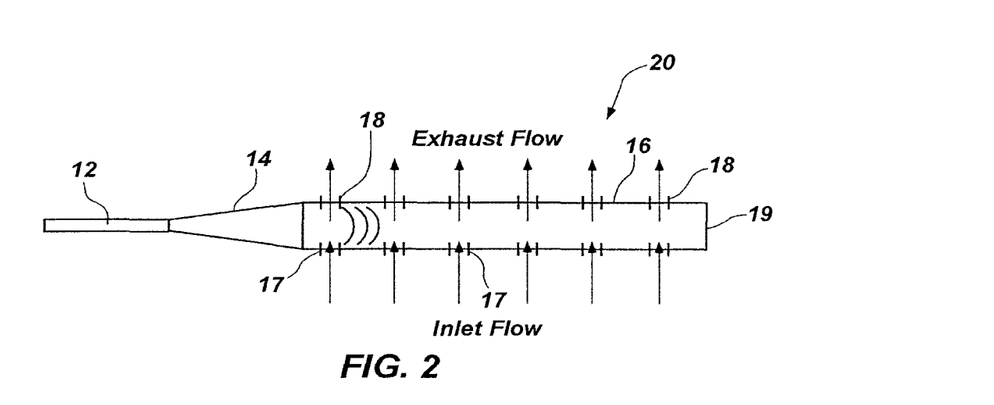
FIG. 2 is a cross-sectional view of a cross flow pulse detonation engine of the present invention.

Illustrated in FIG. 2 is a cross flow-type pulse detonation engine 20 of the present invention having a detonation initiation tube 12 where fuel and an oxidizer, typically air, are mixed and ignited in a deflagration-to-detonation transition (DDT) to start a high energy deflagration. The tube 12 is connected to a frustoconical annular air valve and detonation wave expansion member 14 where the detonation wave from the detonation of the fuel-air mixture in the tube 12 expands as it flows through the member 14 into the combustor tube 16 to flow therefrom to produce thrust from the detonation of the fuel-air mixture in the tube 12. In contrast to the pulse detonation engine 10 illustrated in FIG. 1, the pulse detonation engine 20 has an end 19 of the combustor tube 16 closed so that the inlet flow for the pulse detonation engine 20 flows across the wall of the combustor tube 16 thereinto through apertures 17 and across the wall of the combustor tube 16 therefrom through apertures 18 to be directed using suitable apparatus to produce thrust from the pulse detonation engine 20. As illustrated, while the detonation wave flows both along the length of the combustor tube 16 and across the combustor tube 16 to exit therefrom through apertures 18 through the side wall of combustor tube 16, rather than exiting from the end of combustor tube 16. In this manner, since the detonation wave traverses the width of the combustor tube 16 to exit from the combustor tube 16 and the width of the combustor tube 16 is less than that of the length of the combustor tube 16, the detonation process and exit of the combustion gases from the combustor tube 16 can occur more rapidly in comparison to that of the exit of the combustion gases for the conventional pulse detonation engine 10 illustrated in FIG. 1.

Figure 3:
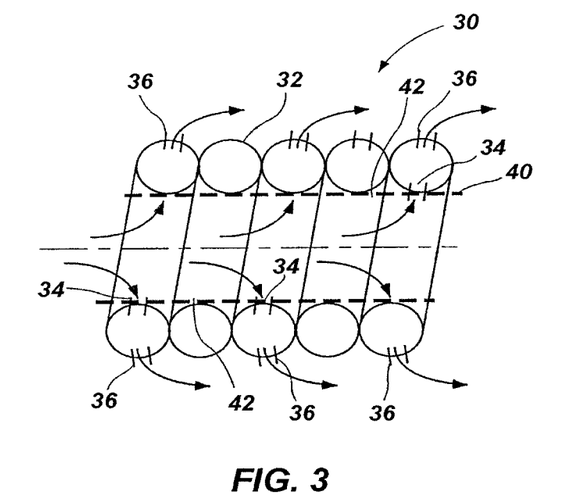
FIG. 3 is a cross-sectional view of a helical cross flow pulse detonation engine of the present invention where a combustor tube is formed in a helix with oxidizer flow from an interior of the combustor tube.

Illustrated in FIG. 3 is an embodiment of the present invention of a helical cross flow pulse detonation engine 30 where a combustor tube 32 is formed in a helical shape with the combustor tube 32 having five (5) revolutions of tube, although any number of revolutions of the tube may be used to form the helical shape, of the combustor tube 32, which has a plurality of holes 34 located on an interior of the helical-shaped combustor tube 32. A rotating helical inlet ribbon valve 40 is located on the interior of the helical-shaped combustor tube 32 with the rotating helical inlet ribbon valve 40 formed in a helix having a continuous slot 42 therethrough operating as a rotating helical inlet ribbon valve 40 to control the flow of an oxidizer, typically air, through the holes 34 into the combustor tube 32 when the rotating helical inlet ribbon valve 40 is rotated. The helical-shaped combustor tube 32 has a plurality of holes 36 formed therethrough on the exterior of the combustor tube 32 that allow the flow of combustion gas from the combustor tube 32 to flow therethrough, after detonation of the fuel-oxidizer in the combustor tube 32. Not shown in FIG. 3 are a suitable fuel source and suitable igniter for the combustor tube 32. As illustrated, the fuel will be mixed with a suitable oxidizer, typically air, in the combustor tube 32 with the rotating helical inlet ribbon valve 40 controlling the flow of oxidizer into the combustor tube 32 by the alignment of the slot 42 of the rotating helical inlet ribbon valve 40 with the holes 34 of the combustor tube 32 with the mixture of fuel and oxidizer to be ignited in a pulsed detonation within the combustor tube 32 with the combustion products flowing from the combustor tube 32 through holes 36 therein. After exiting the combustor tube 32, the combustion products are directed by suitable apparatus (not shown) to produce thrust from the helical cross flow pulse detonation engine 30. Since the flow of the oxidizer and combustion products from the detonation of fuel and oxidizer is across the width or diameter of the combustor tube 32, rather than along the length thereof, the pulse cycle time for the detonation and flow across the combustor tube 32 is reduced from that of detonation and flow along the length of the combustor tube 32, thereby allowing a higher rate of detonation of the fuel and oxidizer within the combustor tube 32. The combustor tube 32 includes a defined helical pitch angle of greater than zero (0) degrees with respect to the central axis of the combustor tube 32.

Figure 4:
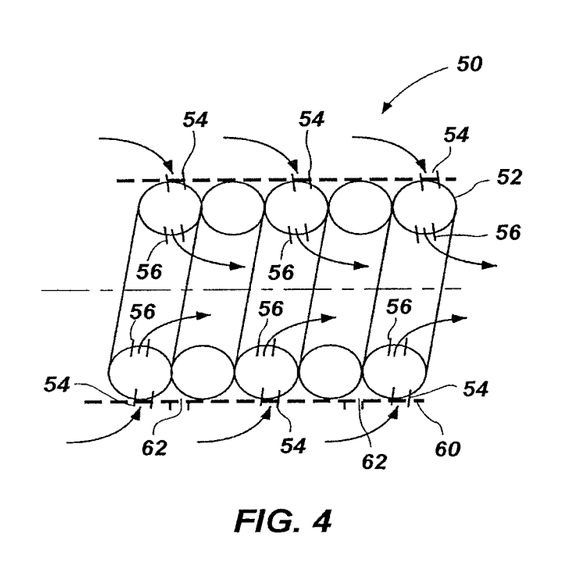
FIG. 4 is a cross-sectional view of a helical cross flow pulse detonation engine of the present invention where a combustor tube is formed in a helix with oxidizer flow from an exterior of the combustor tube.

Illustrated in FIG. 4 is an embodiment of the present invention of a helical cross flow pulse detonation engine 50 where a combustor tube 52 is formed in a helical shape with the combustor tube 52 having five (5) revolutions of tube, although any number of revolutions of tube may be used to form the helical shape of the combustor tube 52 which has a plurality of holes 54 located on an exterior of the helical-shaped combustor tube 52. A rotating helical inlet ribbon valve 60 is located on the exterior of the helical-shaped combustor tube 52 with the rotating helical inlet ribbon valve 60 formed in a helix having a continuous slot 62 therethrough operating as a rotating helical inlet ribbon valve 60 to control the flow of an oxidizer, typically air, through the holes 34 into the combustor tube 52 when the rotating helical inlet ribbon valve 60 is rotated. The helical-shaped combustor tube 52 has a plurality of holes 56 formed therethrough on the interior of the combustor tube 52 that allow the flow of combustion gas from the combustor tube 52 to flow therethrough, after detonation of the fuel-oxidizer in the combustor tube 52. Not shown in FIG. 4 are a suitable fuel source and suitable igniter for the combustor tube 52. As illustrated, the fuel will be mixed with a suitable oxidizer, typically air, in the combustor tube 52 with the rotating helical inlet ribbon valve 60 controlling the flow of oxidizer into the combustor tube 52 by the alignment of the slot 62 of the rotating helical inlet ribbon valve 60 with the holes 54 of the combustor tube 52 with the mixture of fuel and oxidizer to be ignited in a pulsed detonation within the combustor tube 52 with the combustion products flowing from the combustor tube 52 through holes 56 therein. After exiting the combustor tube 52, the combustion products are directed by suitable apparatus (not shown) to produce thrust from the helical cross flow pulsed detonation engine 50. Since the flow of the oxidizer and combustion products from the detonation of fuel and oxidizer is across the width or diameter of the combustor tube 52, rather than along the length thereof, the pulse cycle time for the detonation and flow across the combustor tube 52 is reduced from that of detonation and flow along the length of the combustor tube 52, thereby allowing a higher rate of detonation of the fuel and oxidizer within the combustor tube 52. The combustor tube 52 includes a defined helical pitch angle of greater than zero (0) degrees with respect to the central axis of the combustor tube 52.

Figure 5:
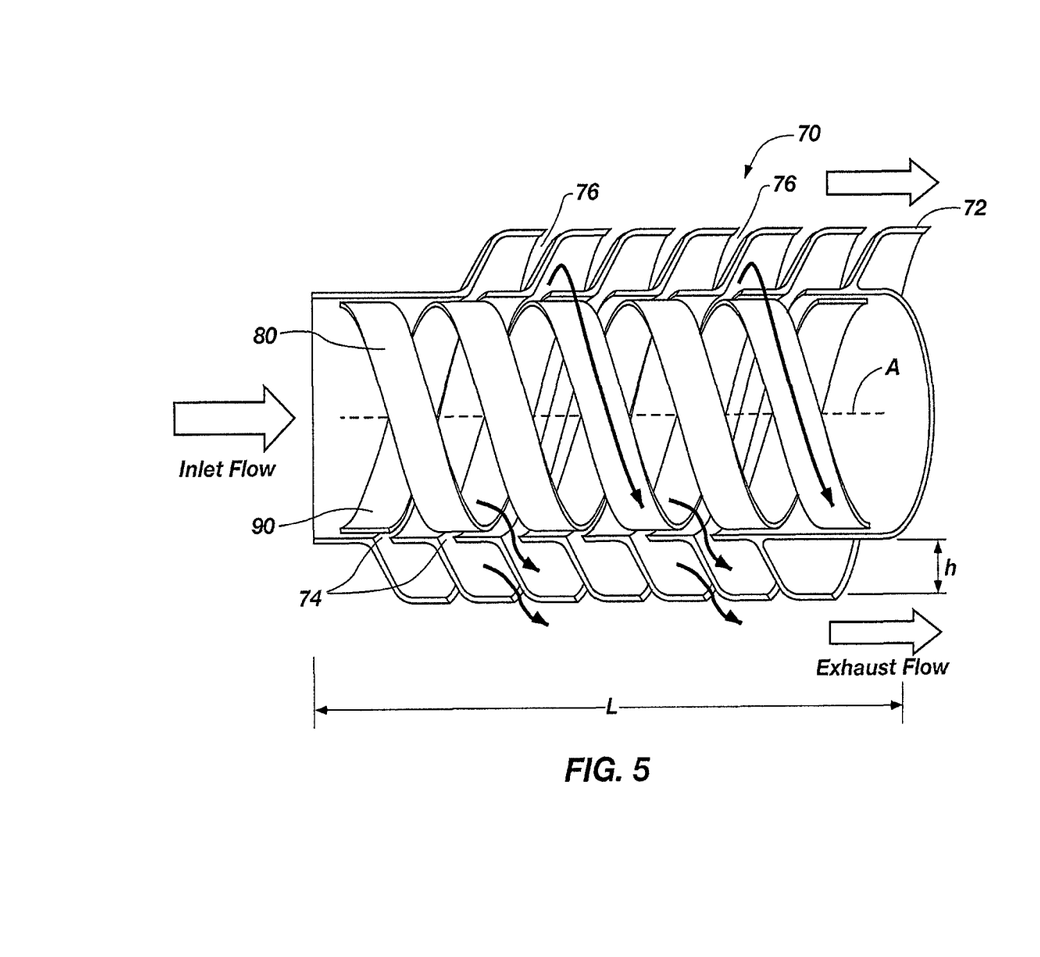
FIG. 5 is a cross-sectional view of a helical cross flow pulse detonation engine of the present invention where a combustor tube is formed in a helix as a Z-shaped member with oxidizer flow from an interior of the combustor tube controlled by a double helical ribbon inlet valve.

Illustrated in FIG. 5 is yet another embodiment of the present invention of a helical cross flow pulse detonation engine 70 where a combustor tube 72 is formed in a helical shape having a Z-shaped member wrapped in a helix around a central longitudinal axis A with the bottom of the Z-shaped member forming a continuous annular slot 74 with respect to the bottom of the Z-shaped member adjacent thereto on the interior of the helical-shaped combustor tube 72 and with the top of the Z-shaped member forming a continuous annular slot 76 with respect to the top of the Z-shape adjacent thereto. As set forth in FIG. 5, the helical cross flow pulse detonation engine 70 includes three (3) combustor tubes 72, which wrap or rotate two (2) full revolutions about a central axis A having a defined pitch angle greater than zero (0) degrees with respect to the central axis A. Rotating helical inlet ribbon valves 80 and 90 located on the interior of the helical-shaped combustor tube 72 control the flow of oxidizer or air into the slot 74, each rotating helical inlet ribbon valve 80 and 90 having a helix shape and a center of rotation about the axis A of the combustor tube 72. The rotation of helical inlet ribbon valves 80 and 90 intermittently covers the annular slot 74 of the combustor tube 72 as they are rotated about axis A in the interior of the combustor tube 72 to control the flow of oxidizer, typically air, into the combustor tube 72. The helical-shaped combustor tube 72 has a continuous annular slot 76 formed by an upper portion of a Z-shaped member by the helix of the combustor tube 72 that allows the flow of combustion gas from the combustor tube 72 of the detonation of the fuel-oxidizer in the combustor tube 72. Not shown in FIG. 5 are a suitable fuel source and suitable igniter for the combustor tube 72. As illustrated, the fuel will be mixed with a suitable oxidizer, typically air, in the combustor tube 72 with the rotating helical inlet ribbon valves 80 and 90 controlling the flow of oxidizer into the combustor tube 72 by the opening of the annular slot 74 being controlled by the rotating helical inlet ribbon valves 80 and 90 to be ignited in a pulsed detonation within the combustor tube 72 with the combustion products flowing from the combustor tube 72 through annular slot 76 therein. After exiting the combustor tube 72, the combustion products are directed by suitable apparatus (not shown) to produce thrust from the helical cross flow pulse detonation engine 70. Since the flow of the oxidizer and combustion products from the detonation of fuel and oxidizer is across the height "h" of a stem of a Z-shaped member of the combustor tube 72, rather than along the length "L" of the combustor tube 72, the pulse cycle time for the detonation and flow across the combustor tube 72 is reduced from that of detonation and flow along the length of the combustor tube 72. Since the combustor tube 72 is formed in a helix and each helical inlet ribbon valve 80 and 90 are each formed in a separate helix, the helical cross flow pulse detonation engine 70 can be referred to as a triple helix cross flow pulse detonation engine 70.

Figure 5A:
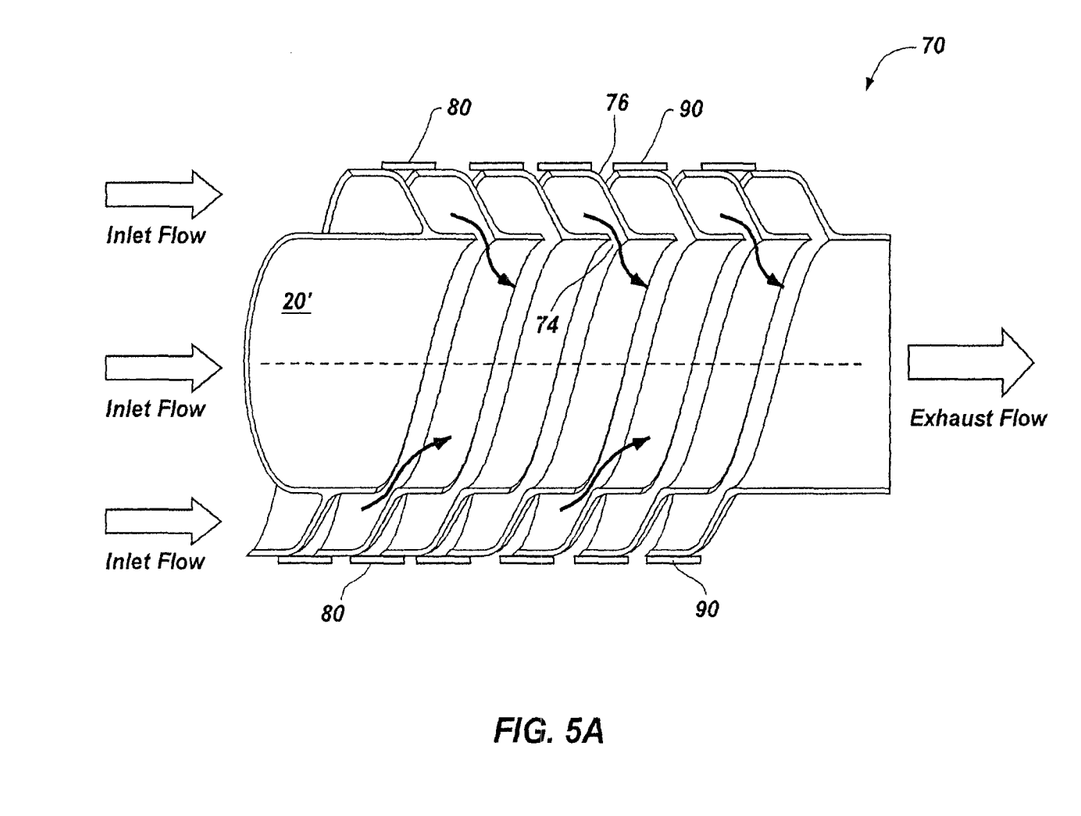
FIG. 5A is a cross-sectional view of a cross flow pulse detonation engine of the present invention where a combustor tube is formed in a helix as a Z-shaped member with oxidizer flow from an exterior of the combustor tube controlled by a helical ribbon inlet valve.

Illustrated in FIG. 5A, if desired, the helical cross flow pulse detonation engine 70 may be configured to have helical inlet ribbon valves 80 and 90 located on the exterior of the helical-shaped combustor tube 72 so the flow through the combustor tube 72 may be reversed so that the air enters from the exterior thereof and exits through the interior thereof, with the double helical inlet ribbon valves 80 and 90 being located on the exterior of the combustor tube 72 controlling the flow of air through the continuous annular slot 76 located on the exterior of the combustor tube 72 with the combustion products flowing from continuous annular slot 74 in the interior of the combustor tube 72. The interior of the combustor tube 72 is blocked by a plug 70' at the inlet or forward portion thereof. The flow through the combustor tube 72 is similar to that described herein and illustrated with respect to the helical cross flow pulsed detonation engine 50 illustrated in FIG. 4. Similar to FIG. 5, the helical cross flow pulse detonation engine 70 includes three (3) combustor tubes 72 that wrap or rotate two (2) full revolutions about the central axis A having a defined pitch angle of greater than zero (0) degrees with respect to the central axis A.

Figure 6:
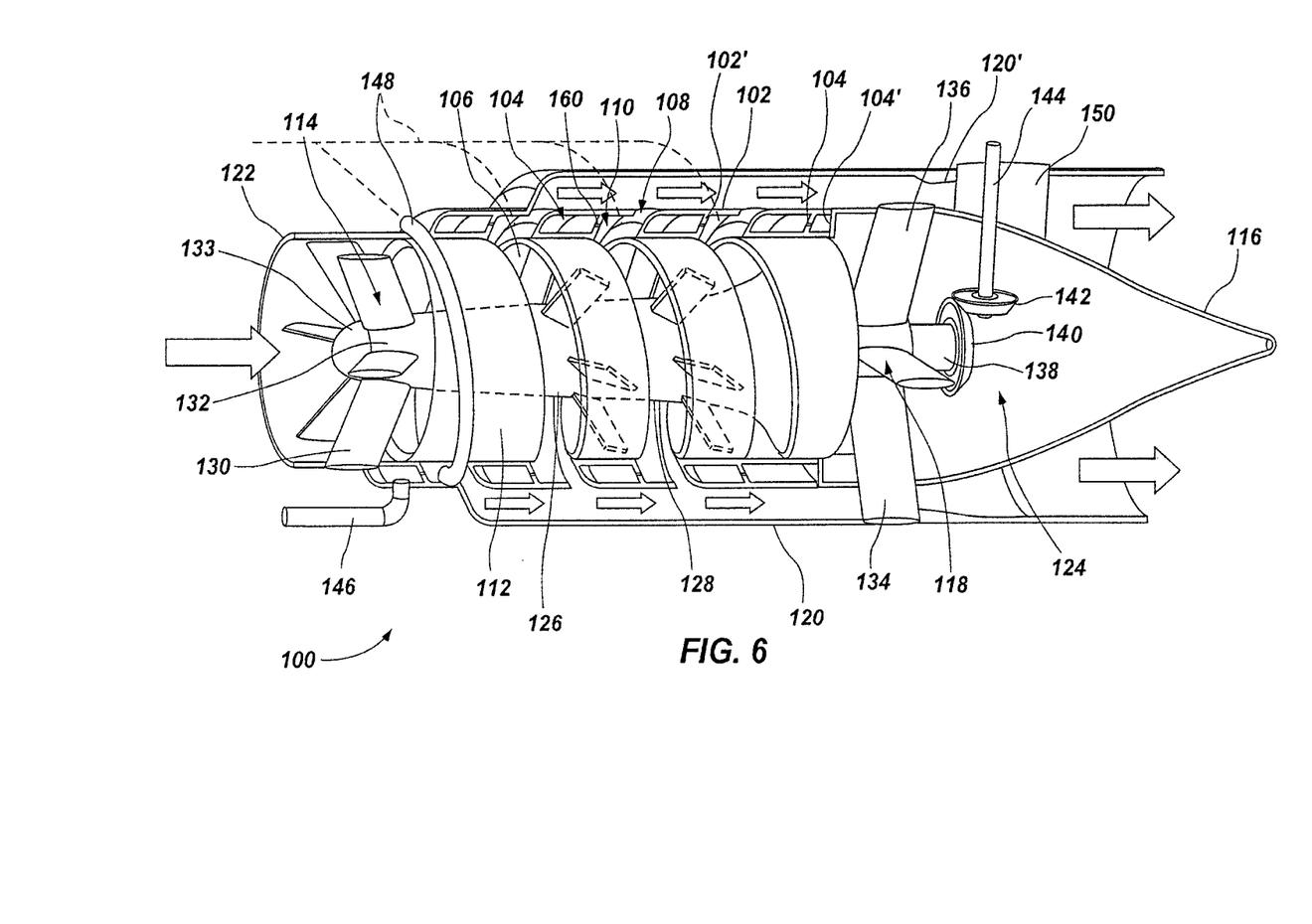
FIG. 6 is a cutaway perspective view of a helical cross flow pulse detonation engine according to the present invention.

Illustrated in FIG. 6 is an embodiment of a helical cross flow pulse detonation engine 100. The helical cross flow pulse detonation engine 100, is similar to that illustrated in drawing FIG. 5. The helical cross flow pulse detonation engine 100 includes a Z-shaped member of a helical combustor tube 102 having a forward side of the Z-shaped member forming an enclosed helical fuel manifold 104 with a forward portion of a stem of the Z-shaped member forming a continuous annular inlet slot 106 for the inlet of air into the helical combustor tube 102 and an aft portion of the Z-shaped member forming a continuous annular outlet slot 108 for the discharge of combustion products from a helical cross flow combustor annular area 110 formed by adjacent stem portions of the Z-shaped member of the combustor tube 102, a helical rotor valve 112 that controls the flow of air into the continuous annular outlet slot 108, a forward bearing compartment 114, a tail cone 116, aft bearing compartment 118, cylindrical annular exhaust manifold 120 having an annular throat 120' at the exit thereof to accelerate combustion products in the exhaust manifold 120 to the speed of Mach 1 thereat for discharge from the helical cross flow pulse detonation engine 100 through the annular exhaust discharge formed by the tail cone 116 and exhaust manifold 120, a cylindrical annular inlet housing 122, and a drive system 124 for the helical rotor valve 112. A stem portion 102' of the Z-shaped member of the helical combustor tube 102 includes a plurality of holes 160 therein for the fuel from the helical fuel manifold 104 to be injected into the helical cross flow combustor annular area 110 which contains air therein from the opening of the continuous annular outlet slot 108 by the helical rotor valve 112, as it is rotated by the valve drive system 124 during operation of the helical cross flow pulse detonation engine 100. The helical rotor valve 112 is connected by a plurality of struts 126 to a helical valve rotor 128 which has a tapered conical shape from the inlet housing 122 to the aft bearing compartment 118 where the rotor helical valve 128 engages the helical rotor valve 112 to seal the helical rotor valve 112 from any flow aft. The forward end of the helical valve rotor 128 is supported by a plurality of struts 130 having one end secured to the cylindrical annular inlet housing 122 and the other end secured to a cylindrical annular rotor hub 132 having a bearing located therein for the helical valve rotor 128 to rotate with respect to the rotor hub 132. A cap 133 having a spherical or frustoconical shape covers an end of the rotor hub 132. The aft end of the helical valve rotor 128 is supported by a plurality of struts 134 having one end supported by aft rotor hub 136 having a bearing therein for the helical valve rotor 128 to rotate with respect to the rotor hub 136 and the other end attached to the interior of exhaust manifold 120. The aft end 138 of the rotor helical valve 128 includes a beveled gear 140 secured thereto which engages with a matching beveled gear 142 on shaft 144 connected to a suitable power supply to drive the rotor 128 and helical rotor valve 112 at the desired speeds during operation of the helical cross flow pulse detonation engine 100. The helical cross flow pulse detonation engine 100 further includes a fuel supply 146 connected to the helical fuel manifold 104 to supply fuel to the helical cross flow pulse detonation engine 100 and a deflagration-to-detonation transition tube 148 which connects to the helical cross flow combustor annular area 110 as shown schematically in broken lines to start and maintain detonation combustion therein in the engine 100. The deflagration-to-detonation transition tube 148 is formed in a "Shchelkin spiral" which is designed to create the most useful eddies with the least resistance to the moving fuel/air/exhaust mixture for the initiation of detonation combustion in the helical cross flow combustor annular area 110. The tail cone 116 is retained within the exhaust manifold 120 by a plurality of struts 150 each having one end secured to the exhaust manifold 120 aft of the annular throat 120' and the other end secured to the tail cone 116. The forward end 116' of the tail cone 116 is connected to the aft end 104' of the helical fuel manifold 104 for the exterior surface of the tail cone 116 to form the cylindrical annular interior surface of the throat 120' in conjunction with the exhaust manifold 120 for the helical cross flow pulse detonation engine 100.

Figure 7:
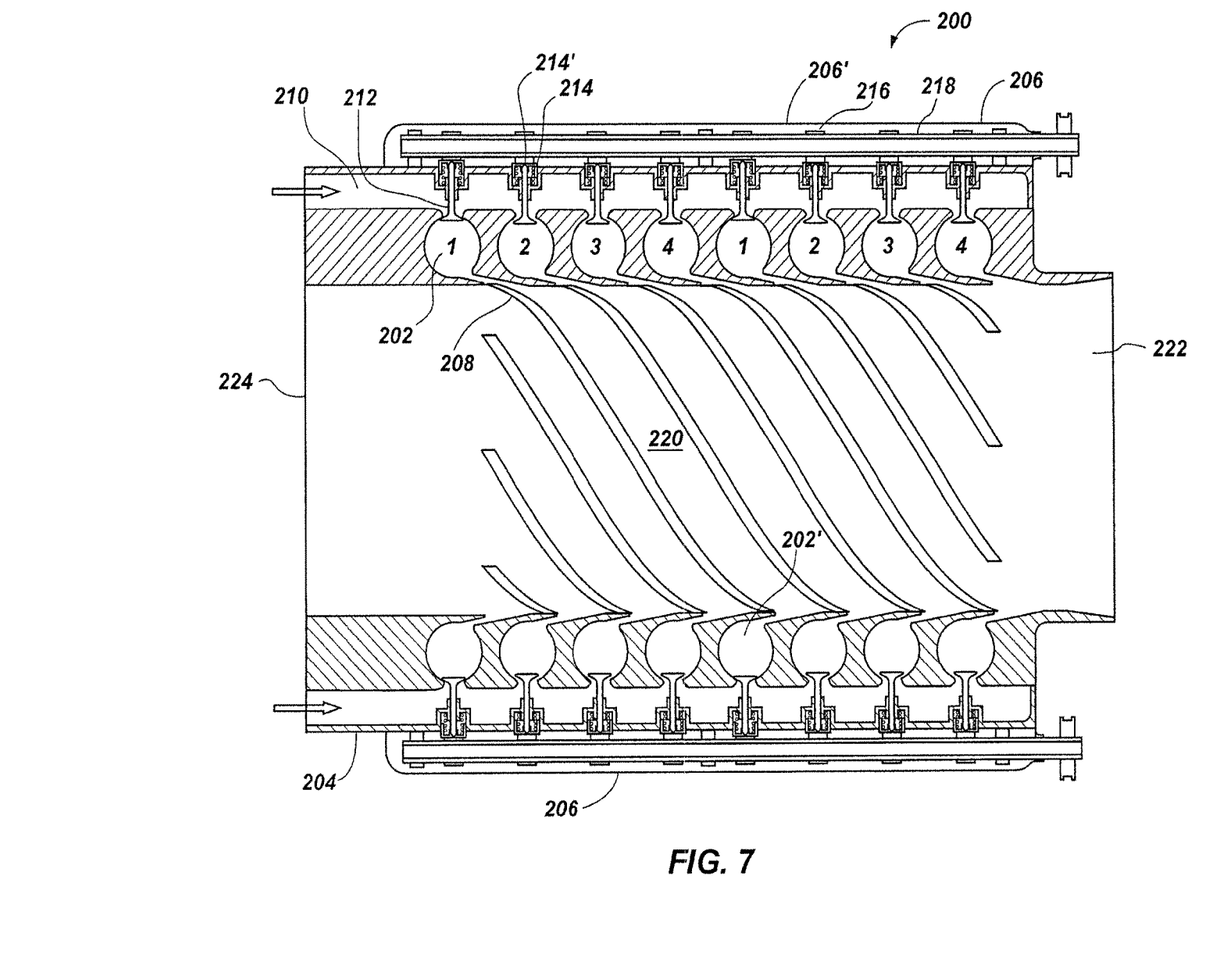
FIG. 7 is a cross-sectional view of another embodiment of a helical cross flow pulse detonation engine according to the present invention.

Illustrated in FIG. 7 is another embodiment of a helical cross flow pulse detonation engine 200 including helical-shaped combustor tubes 202 therein. The helical cross flow pulse detonation engine 200 includes four (4) combustor tubes 202 therein having each combustor tube 202 wrapping one full revolution about a central axis A having a defined pitch angle greater than zero (0) degrees with respect to central axis A. The helical cross flow pulse detonation engine 200 includes a cylindrical annular housing 204 having a central axis A, a plurality of helical combustors 202, and a plurality of valve assemblies 206 controlling the flow of oxidizer, typically air, into the helical-shaped combustor tubes 202. The cylindrical annular housing 204 comprises a cylindrical annular member having a first helical-shaped combustor tube 202 and a second helical combustor tube 202' formed therein, each helical-shaped combustor tube 202 and 202' including four (4) revolutions forming the combustor tube 202 and 202' although any desired number of revolutions may be used to form the helical combustor tube 202 and 202'. Each helical combustor tube 202 and 202' includes a generally circular cross-section having a continuous helical annular exhaust exit slot 208 formed for each combustor tube 202 and 202'for the flow of combustion gas from the combustor tube 202 and 202'. The cylindrical annular housing 204 includes a plurality of valve assemblies 206, each valve assembly 206 including an inlet port 210, a plurality of cylindrical valves 212, each cylindrical valve 212 having a valve stem being held in a closed position preventing airflow into the helical combustor tube 202 or 202' by a suitable spring 214 engaging a portion of the valve stem by means of a valve retainer 214' and actuated during opening by a lobe 216 of a camshaft 218 in an assembly housing 206', the camshaft 218 being driven by a suitable source of power. The opening of the valves 212 is controlled by the desired profile of the lobes 216 on the camshaft 218. Not shown in FIG. 7 is a suitable fuel source and a suitable igniter for the combustor tube 202 and 202'. After detonation in a helical combustor tube 202 and 202', the combustion gases flow from the helical combustor tube 202 and 202' out helical annular exhaust slot 208 therefrom into the cylindrical exhaust portion 220 formed about the central axis A of the helical cross flow pulse detonation engine 200 to exit therefrom through exhaust nozzle 222. The interior of the helical cross flow pulse detonation engine 200 along central axis A is blocked by a suitable member 224 preventing the flow of combustion gases exiting the helical annular exhaust slot 208 from the front of the helical cross flow pulse detonation engine 200 so that thrust is produced by the flow of combustion gases from the nozzle 222 from the helical cross flow pulse detonation engine 200.

Figure 8:
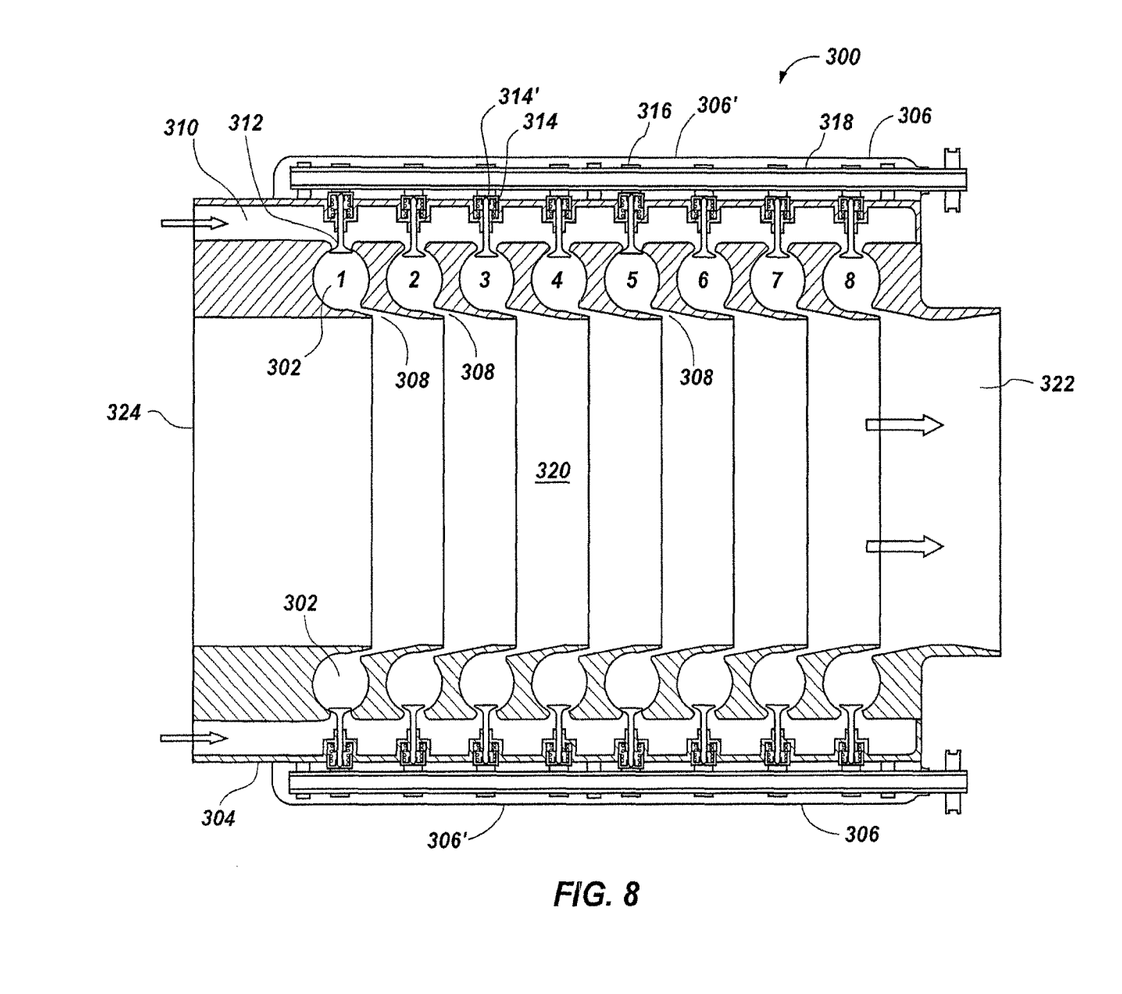
FIG. 8 is a cross-sectional view of another embodiment of a helical cross flow pulse detonation engine according to the present invention.

Illustrated in FIG. 8 is another embodiment of an annular cross flow pulse detonation engine 300 including annular combustor tubes 302 therein. The annular cross flow pulse detonation engine 300 includes eight (8) annular combustor tubes 302 with each annular combustor tube 302 having a zero (0) degree helical angle or zero (0) degree pitch angle for the revolution of the annular combustor tube 302 about a central axis A. The annular cross flow pulse detonation engine 300 includes a cylindrical annular housing 304 having a central axis A, a plurality of annular combustors 302, and a plurality of valve assemblies 306 controlling the flow of oxidizer, typically air, into the annular combustor tubes 302. The cylindrical annular housing 304 comprises a cylindrical annular member having annular combustor tubes 302 formed therein, each annular combustor tube 302 including one (1) revolution at a zero (0) pitch angle forming the annular combustor tube 302. Each annular combustor tube 302 includes a generally circular cross-section having a continuous annular exhaust exit slot 308 formed for each annular combustor tube 302 for the flow of combustion gas from the annular combustor tube 302. The cylindrical annular housing 304 includes a plurality of valve assemblies 306, each valve assembly 306 including an inlet port 310, a plurality of cylindrical valves 312, each valve 312 having a valve stem being held in a closed position preventing airflow into the combustor tube 302 by a suitable spring 314 engaging a portion of the valve stem by means of a valve retainer 314' and actuated during opening by a lobe 316 of a camshaft 318 in an assembly housing 306', the camshaft 318 being driven by a suitable source of power. The opening of the cylindrical valves 312 being controlled by the desired profile of the lobes 316 on the camshaft 318. Not shown in FIG. 8 is a suitable fuel source and a suitable igniter for the combustor tube 302. After detonation in a combustor tube 302, the combustion gases flow from the combustor tube 302 out annular exhaust slot 308 therefrom into the cylindrical exhaust portion 320 formed about the central axis A of the cross flow pulse detonation engine 300 to exit therefrom through exhaust nozzle 322. The interior of the annular cross flow pulse detonation engine 300 along central axis A is blocked by a suitable member 324 preventing the flow of combustion gases exiting the annular exhaust slot 308 from the front of the cross flow pulse detonation engine 300 so that thrust is produced by the flow of combustion gases from the nozzle 322 from the annular cross flow pulse detonation engine 300.

Figure 9:
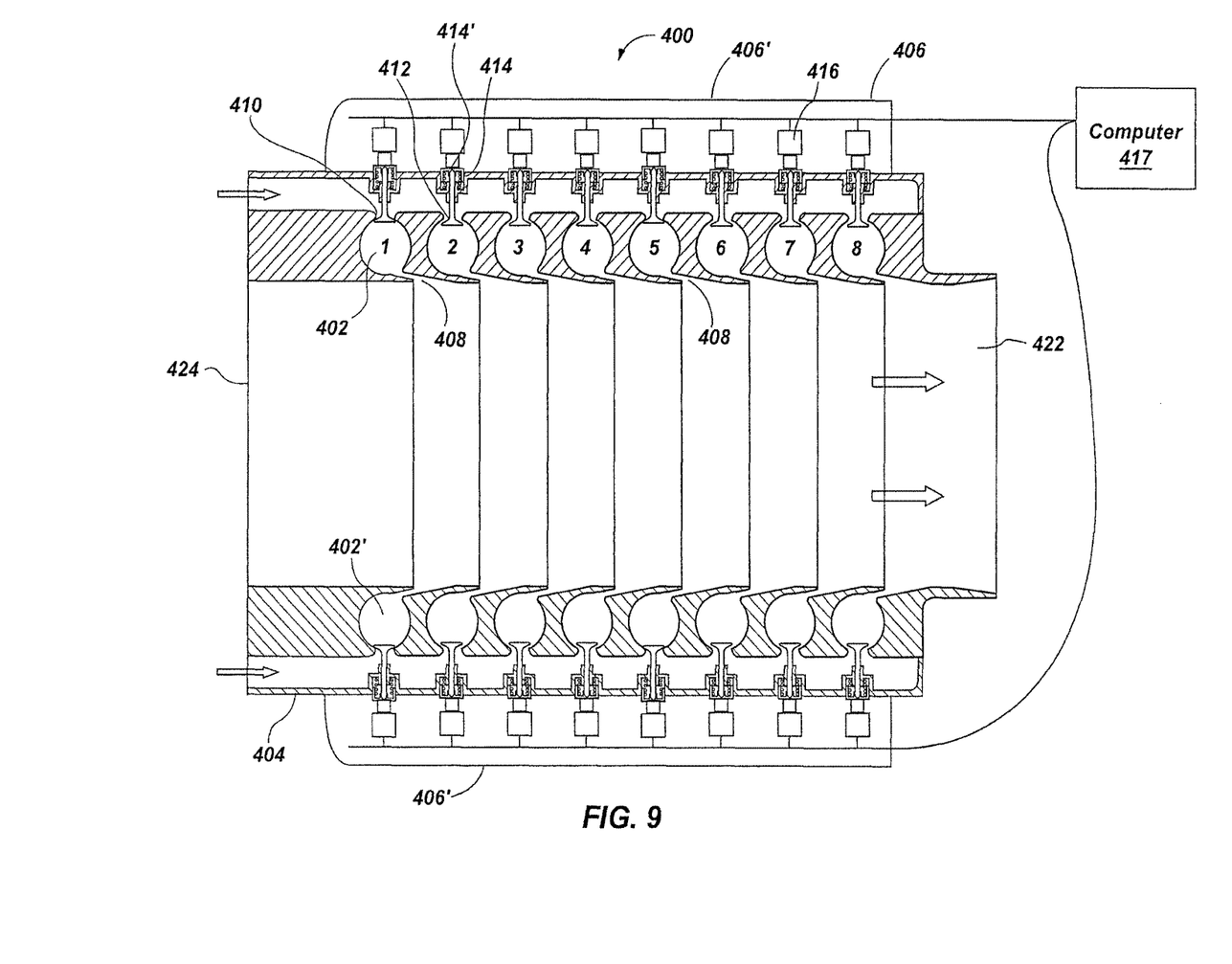
FIG. 9 is a cross-sectional view of another embodiment of a helical cross flow pulse detonation engine according to the present invention.

Illustrated in FIG. 9 is another embodiment of an annular cross flow pulse detonation engine 400 including annular combustor tubes 402 therein. The annular cross flow pulse detonation engine 400 includes eight (8) combustor tubes 402 with each combustor tube 402 having a zero (0) degree helical angle or zero (0) degree pitch angle for the revolution of the combustor tube 402 about the central axis A. The annular cross flow pulse detonation engine 400 includes a cylindrical annular housing 404 having a central axis A, a plurality of annular-shaped combustor tubes 402, and a plurality of valve assemblies 406 controlling the flow of oxidizer, typically air, into the annular-shaped combustor tubes 402. The cylindrical annular housing 404 comprises a cylindrical annular member having annular-shaped combustor tubes 402 formed therein, each annular-shaped combustor tube 402 including one (1) revolution at a zero (0) pitch angle about central axis A forming the combustor tube 402. Each annular-shaped combustor tube 402 includes a generally circular cross-section having a continuous annular exhaust exit slot 408 formed for each combustor tube 402 for the flow of combustion gas from the combustor tube 402. The cylindrical annular housing 404 includes a plurality of valve assemblies 406, each valve assembly 406 including an inlet port 410, a plurality of cylindrical valves 412, each valve 412 having a valve stem being held in a closed position preventing airflow into the combustor tube 402 by a suitable spring 414 engaging a portion of the valve stem by means of a valve retainer 414' and actuated during opening by a solenoid 416 connected to a suitable digital computer 417 in an assembly housing 406'. The opening of the valves 412 is controlled by the digital computer 417 using suitable software sending a signal to the solenoid 416 causing the actuation thereof to open a valve 412. Not shown in FIG. 7 are a suitable fuel source and suitable igniter for the combustor tube 402. After detonation in a combustor tube 402, the combustion gases flow from the combustor tube 402 out annular exhaust slot 308 therefrom into the cylindrical exhaust portion 420 formed about the central axis A of the annular cross flow pulse detonation engine 400 to exit therefrom through exhaust nozzle 422. The interior of the annular cross flow pulse detonation engine 400 along central axis A is blocked by a suitable member 424 preventing the flow of combustion gases exiting the annular exhaust slot 408 from the front of the annular cross flow pulse detonation engine 400 so that thrust is produced by the flow of combustion gases from the nozzle 422 from the annular cross flow pulse detonation engine 400.

It will be apparent to those of skill in the art that changes, revisions, additions, and deletions may be made to the present invention, such as having more than one helical rotor valve in the interior of the pulse detonation engine 100, having the engine configuration similar to that illustrated in and described with respect to drawing FIG. 5A, etc. Such are intended to be within the scope of the claimed invention.

What is claimed is:

1. A helical cross flow combustor pulse detonation engine comprising:
   a cylindrical annular housing having an outer surface and an inner surface;
   a pulse detonation combustor embedded within the cylindrical annular housing and comprising:
     a helical cylindrical member confined between the outer surface and the inner surface of the cylindrical annular housing;
     at least one inlet port extending into the helical cylindrical member from the outer surface of the cylindrical annular housing; and
     a continuous annular slot extending from the helical cylindrical member to the inner surface of the cylindrical annular housing;
   at least one valve configured and positioned to control flow of oxidizer into the helical cylindrical member through the at least one inlet port;
   at least one resilient member configured and positioned to resiliently bias the at least one valve closed;
   an actuation member configured and positioned to open the at least one valve; and
   a nozzle configured and positioned to flow combustion gases from an exhaust region circumscribed by the cylindrical annular housing.

2. The helical cross flow pulse combustor pulse detonation engine of claim 1, wherein the actuation member comprises a camshaft in operable contact with the at least one valve.

3. The helical cross flow pulse combustor pulse detonation engine of claim 1, wherein the at least one inlet port comprises a plurality of inlet ports, and the at least one valve comprises a plurality of valves, one valve per each inlet port.

4. The helical cross flow pulse combustor pulse detonation engine of claim 3, wherein the actuation member comprises at least one camshaft in operable contact with each valve of the plurality.

5. The helical cross flow pulse combustor pulse detonation engine of claim 1, wherein the helical cylindrical member exhibits a pitch angle greater than zero degrees relative to a central axis of the helical cylindrical member.

6. The helical cross flow pulse combustor pulse detonation engine of claim 1, wherein the helical cylindrical member comprises a helical-shaped tube.

7. The helical cross flow pulse combustor pulse detonation engine of claim 1, wherein the at least one resilient member comprises at least one spring in contact with the at least one valve and at least one valve retaining structure.

8. The helical cross flow pulse combustor pulse detonation engine of claim 1, wherein the actuation member comprises a camshaft having at least one lobe configured and positioned to control opening of the at least one valve.

9. The helical cross flow pulse combustor pulse detonation engine of claim 1, further comprising at least one structure configured and positioned to prevent the combustion gases from exiting a front section of the helical cross flow combustor pulse detonation engine.

10. The helical cross flow pulse combustor pulse detonation engine of claim 1, further comprising:
    at least one additional pulse detonation combustor embedded within the cylindrical annular housing and comprising:
      at least one additional helical cylindrical member confined between the outer surface and the inner surface of the cylindrical annular housing;
      at least one additional inlet port extending into the at least one additional helical cylindrical member from the outer surface of the cylindrical annular housing; and
      at least one additional continuous annular slot extending from the at least one additional helical cylindrical member to the inner surface of the cylindrical annular housing;
    at least one additional valve configured and positioned to control flow of the combustion gases into the at least one additional helical cylindrical member through the at least one additional inlet port; and
    at least one additional resilient member operatively associated with the actuation member and resiliently biasing the at least one additional valve closed.

11. A helical cross flow pulse combustor pulse detonation engine comprising:
    at least one helical-shaped combustor tube confined within a thickness of a cylindrical annular housing and having a sidewall exhibiting each of at least one oxidizer inlet and a combustion gas outlet therein;

at least one valve assembly operatively associated with the at least one helical-shaped combustor tube and comprising:
   at least one cylindrical valve switchable between a closed position preventing flow of oxidizer through the at least one oxidizer inlet and an open position permitting flow of the oxidizer through the at least one oxidizer inlet;
   at least one spring configured and positioned to hold the at least one cylindrical valve in the closed position; and
   at least one actuator configured and positioned to adjust the at least one cylindrical valve to the open position upon a triggering event;

a cylindrical exhaust region surrounded by and in fluid communication with the at least one helical-shaped combustor tube; and a nozzle positioned at an end of the cylindrical exhaust region.

12. The helical cross flow pulse combustor pulse detonation engine of claim 11, wherein the at least one helical-shaped combustor tube comprises a plurality of helical-shaped combustor tubes each wrapping at least one full revolution about a central axis of the cylindrical exhaust region.

13. The helical cross flow pulse combustor pulse detonation engine of claim 12, wherein each of the plurality of helical-shaped combustor tubes exhibits a pitch angle greater than zero degrees with respect to a central axis thereof.

\* \* \* \* \*